Nov. 17, 1959  H. WACHHOLZ  2,913,701
ELECTRODYNAMIC TRANSDUCERS FOR VIBRATIONS
TRANSMITTED THROUGH SOLIDS
Filed July 2, 1958  2 Sheets-Sheet 1

Helmut Wachholz
INVENTOR

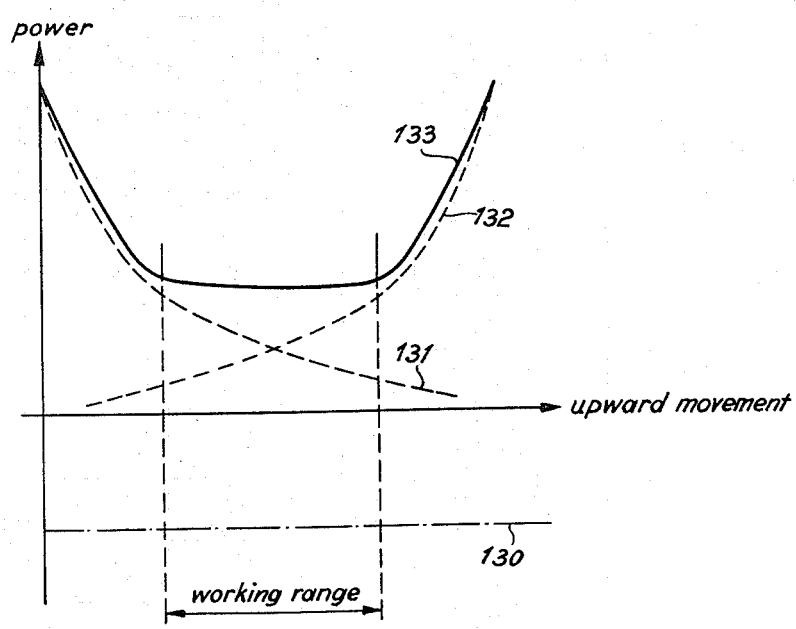

United States Patent Office 2,913,701
Patented Nov. 17, 1959

2,913,701

ELECTRODYNAMIC TRANSDUCERS FOR VIBRATIONS TRANSMITTED THROUGH SOLIDS

Helmut Wachholz, Hannover, Germany, assignor to Prakla Gesellschaft für Praktische Lagerstättenforschung G.m.b.H., Hannover, Germany, a German company Application July 2, 1958, Serial No. 746,223

Claims priority, application Germany July 5, 1957

6 Claims. (Cl. 340—17)

This invention relates to electrodynamic transducers for vibrations transmitted through solids.

One example of the use of transducers according to the invention is as seismometers or geophones, as employed in the investigation of the earth's crust near to the surface by the seismic refraction or reflection method.

Especially for carrying out refraction measurements, it is necessary to employ seismometers or geophones whose oscillatory system has a very low natural frequency of oscillation, generally of a few cycles per second, because it is such frequencies which are measured at relatively large distances from the shot point owing to the filtering action of the earth's strata. Thus the natural frequency of the seismometers employed must be of this order of magnitude in order to obtain sufficient sensitivity. Difficulties are encountered in the construction of such seismometers, but such difficulties are not of a fundamental nature because any natural frequency of oscillation can be obtained by increasing the size of the vibrating mass or reducing the spring restoring force by the use of very weak springs. However, in order to construct geophones which can be used in the field, that is to say moved frequently from place to place, the total weight of the geophone must not exceed a certain amount, and it is impossible to operate geophones having very weak springs with a large mass, because the instruments are often subjected to rough treatment so that damage to relatively large vibratory masses having weak suspension springs would be unavoidable.

It is an object of the present invention to provide an electrodynamic transducer having a low frequency of natural vibration, but which nevertheless is robust and not readily damaged when used in the field.

This object is achieved in accordance with the invention by providing two magnetic systems mounted on either side of the vibratory system which includes a third magnetic system, the first two magnetic systems being of such polarity that one system exerts a repelling action on the magnetic system of the vibratory system, while the other system exerts an attractive force thereon, in such manner that a zone of constant magnetic force is produced which is equal to the value of the force of gravity, but of opposite direction. Consequently, the vibratory system can be regarded as substantially free from gravity within this working region.

Preferably, for damping the oscillations the nonmagnetic parts of the vibratory system are made of a material having high electrical conductance, preferably copper or aluminium.

One construction of electrodynamic transducer for solid-transmitted sounds will now be described, by way of example only, with reference to the accompanying drawings in which:

Figure 2 shows a curve of movement plotted against power for the vibratory system of the transducer.

Figure 1:
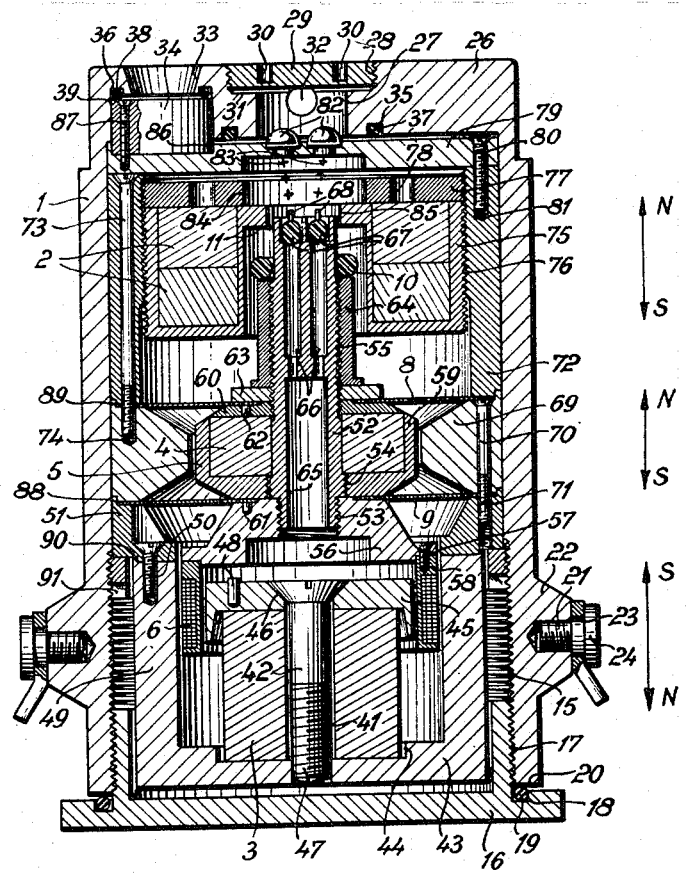
Figure 1 is a sectional side elevation of the transducer.

Referring firstly to Figure 1, it will be seen that the transducer, which in this case is designed particularly for use as a seismometer or geophone, comprises a housing 1 containing two pot-magnets 2 and a magnetic system 3. The oscillatory system of the transducer is mounted on springs or so-called "spider" diaphragms 8 and 9, the system consisting of a body 5 which supports an oscillation coil 6 and a magnet 4, the coil 6 being suspended in an annular air gap in the magnetic system 3.

Considering the construction in greater detail it will be seen that the housing 1, which is cylindrical, is provided near one end with an internal screwthread 15 into which a closure cap 16, provided with an external screwthread 17, is adapted to be screwed. The cap 16 is formed with an annular groove 18 in a part adjacent the end face 20 of the housing 1, which groove 18 serves to receive a sealing ring 19 which bears against the face 20 when the cover 16 is firmly tightened and thus seals the housing 1 at this point against the penetration of moisture or dirt. The substantially round cap 16 may be flattened on two diametrically opposite sides, so that two parallel faces are formed, to which a spanner can be applied for tightening the cap.

Two conical projections 22 provided with an internal screwthread 21 each serve to receive one cylindrically headed screw 24 provided with an extension 23. The loops of a carrier strap (not shown) can be passed around the said extensions 23. The projections 22 are arranged in the lower third of the housing 1, so that when the transducer is gripped by the carrier strap it is rotated through 180° from the operative position shown in Figure 1, whereby the vibratory system is restrained from movement as will hereinafter be described. The housing base 26 situated at the opposite end of the housing 1 to the cap 16 has a central bore 27 accessible through an internally screwthreaded bore 28. The bore 28 is adapted to be closed by an externally screwthreaded disc 29 having apertures 30 for receiving a spanner. The disc 29 bears on the shoulders 31 formed in the base 26 by the differing diameters of the bores 27 and 28. The bore 27 serves for making the electrical connections between the transducer and the measuring conductor. The measuring conductor can be introduced from the side into the aperture 27 through a radially extending aperture 32. A device in the form of a spring wire spiral for protecting the measuring conductor against bending is adapted to be screwed from the outside of the housing into a screwthread cut in the said bore 32.

A further bore 33 of conical form, located eccentrically in the base 26 is provided for the observation of a box spirit level 34 adapted to be pushed into a cylindrical bore 39 formed in the housing base 26 concentrically with the bore 33. Annular grooves 35 and 36 extending concentrically around the bores 27 and 33 respectively in the base 26 serve to receive sealing rings 37 and 38 which, in combination with parts of the actual transducer mounted in the housing 1, prevent penetration of moisture and dirt into the housing 1 through the base 26.

The actual transducer mounted in the housing 1 consists of three main component elements: the main magnetic system 3, the vibratory system 5, and the additional magnetic system 2.

The main magnetic system 3 comprises the actual annular magnet 3 of magnetic material having high coercive force. The axial bore 41 of the magnet 3 accommodates a screw 42. The magnet 3 is mounted with its base in a recess 44 formed centrally in a pot magnet 43. Disposed on the other end face of the magnet 3 is a circular pole face 45 which is substantially U-shaped in cross-section. A countersunk hole 46 is formed in the pole face 45 to conform to the shape of the head of the screw 42 which engages with a screwthread 47 provided in the pot magnet 43. The magnet 3 is tightly secured by the said screw 42 between the recess 44 and the pole face 45. Rubber cushions 48 (only one of which can be seen in Fig. 1) let into the upper face of the pole face 45 damp the movement of the vibratory system 5 when the latter approaches the pole face 45. The side wall 49, of hollow cylindrical form, of the pot magnet 43 surrounds the annular magnet 3 and its pole face 45. Since the pole face 45 and the pot magnet 43 are made of highly permeable material, the magnetic field produced by the magnet 3 extends through the annular air gap formed by the side faces of the pole face 45 and the side wall 49 of the pot magnet 43 so that the winding 6, hereinafter described, of the vibratory system 5 is situated in a radial magnetic field of high field strength. The screw 42 consists of a non-magnetic material, for example brass, in order to avoid shunting of the magnetic field through the screw 42. The pot magnet 43 and consequently the entire main magnetic system are secured by means of countersunk screws 50 to a base ring 51 slidably fitted in the housing 1.

All the parts of the vibratory system 4 are mounted on a magnet support 52 constructed as a turned member with three external screwthreads 53, 54, 55 of stepped diameter. Screwed on the screwthread 53 is a turned member of substantially trapezoidal cross-section, i.e. the coil former support 56, which bears against the shoulder formed by the difference in the diameters of the screw-threads 53 and 54. The annular coil former 58 is secured to the coil former support 56 by means of three countersunk screws 57 (only one of which can be seen in Fig. 1) and supports the winding 6 in a recess formed in its periphery. The arrangement is such that when the transducer is assembled the winding 6 can move in the aforesaid magnetic field in the air gap of the magnet system 3.

Disposed in a corresponding recess in the upper face of the coil former support 56 is a spring or "spider" 9, which is secured against rotation by cylindrical pins 61 driven into corresponding bores in the coil former support 56 and projecting into apertures in the spring 9 which are in alignment with the aforesaid bores. The spring is clamped between the magnet cage 59 and the coil former support 56 by screwing of the magnet cage 59 onto the screw-thread 54 of the magnet support 52. Secured within the magnet cage 59 is the vibration magnet 4, which is held fast in the said cage 59 by a clamping nut 63 screwed on the screw-thread 55 and pressing on the cover 60 of the magnet cage 59.

A spring or "spider" 8 fits against the cover 60 of the magnet cage 59 and is secured against rotation by pins 62 (only one of which can be seen in Figure 1), in a similar manner to the securing of the spring 9 to the former support 56. By tightening the annular clamping nut 63, the spring 8 is clamped fast between the cover 60 of the magnet cage and the clamping nut 63. A lock nut 64 screwed onto the thread 55 on which the nut 63 is also screwed, presses on the nut 63 and prevents involuntary loosening thereof. A resilient ring 10 mounted on the said lock nut 64 serves as a cushion during transit, as will be described hereinafter.

Formed axially within the magnet support 52 is a bore 65, which merges into two bores 66 each closed by a glass bush 67. The said bores 65, 66 serve to guide the connecting wires (not shown) of the winding 6, so that the beginning and the end of the said winding are electrically accessible through soldering tags 68 projecting from the glass bushes 67.

All the parts of the vibratory system 5—apart from the magnet 4—consist of materials whose relative permeability constant is in the neighbourhood of one. The spring 8, 9 consist, for example, of spring bronze, while the remaining parts consist mainly of copper brass or aluminium so that the magnetic field produced by the magnet 4 is formed as in air.

The springs 8, 9 bear at their outer peripheries on a spacing ring 69, which is disposed between the two springs 8, 9 and the height of which is equal to the distance between the two springs 8, 9 at the point at which they are internally held. The spacing ring 69 is of substantially trapezoidal cross-section. Its external diameter is so chosen that the ring is a sliding fit in the housing 1. Its internal diameter is only slightly greater than the external diameter of the magnet cage 59, so that the said spacing ring 69 and the magnet cage 59 simultaneously form a centering means for the oscillatory system 5 within the assembled transducer. In the course of assembly, the spring 9 is laid with its outer edge on the base ring 51 and the spacing ring 69 is tightened by means of screws 70 (only one of which can be seen), which extend through holes in the spacing ring 69 and in the spring 9 and which fit into screw-threaded holes 71 formed in the base ring 51, so that the outer periphery of the spring is gripped between the base ring 51 and the spacing ring 69. Similarly, the outer periphery of the spring 8 is gripped between the upper face of the spacing ring 69 and a magnet housing 72 which is tightened onto the spring 8 by tightening of screws 73 (only one of which can be seen) which extend through holes in the magnet housing 72 and in the spring 8, and which fit into the screwthreaded holes 74 in the spacing ring 69.

The additional magnetic system 2 is mounted in the magnet housing 72. The actual annular magnets 2 lie in an appropriately shaped magnet holder 75 having a screwthread 76 on its outer face. The said screwthread fits into an internal screwthread cut in the magnet housing 72. Thus, the distance between the magnets 2 and 4, and consequently their action upon one another, can be varied by rotation of the magnet holder 75 in the magnet housing 72. The adjustment of the magnet holder 75 in the magnet housing 72 is fixed by a lock nut 77. Apertures 78 formed in the lock nut 77 serve to receive a screw-driver.

The actual transducer is closed at the top by a cover 79 which is secured to the magnet housing in such manner as to seal it by means of countersunk screws 80 (only one of which can be seen) fitting into corresponding screwthreaded holes 81 in the magnet housing 72. Near to the centre of the cover 79 two glass bushes 82 extend through the cover with their upper ends extending into the bore 27 in the housing base 26. The lower terminal portions of the glass bushes 82 are connected in electrically conductive fashion to the soldering tags 68 of the glass bushes 67 by means of connecting spirals 83 represented by crosses. The connecting spirals 83 extend through central bores 84 and 85 formed respectively in the lock nut 77 and in the magnet holder 75. The terminals of the winding 6 are thus electrically connected to the terminal portions (not shown) of the glass bushes 82, so that electrical leads from an external indicating instrument (not shown) may be connected to the latter and thereby connected to the winding 6.

The cover 79 is formed with a recess 86 at the point corresponding to the bore 39 in the housing base 26, and the box spirit level 34 adapted to be secured to the cover 79 by means of screws 87 (only one of which is shown), can be introduced into the said recess. The base ring 51, the spacing ring 69, the magnet housing 72 and the cover 79 are of equal external diameter and are slidably fitted into the interior of the housing 1. Centering devices consisting of circular grooves having circular extensions 88, 89 engaging therein are provided on the three first-mentioned parts to centre the interengaging parts. The external diameter of the pot magnet 43, which is similarly centered with the base ring 51 by means of a circular extension 90, is smaller than the external diameter of the first-mentioned parts. Fitted over the pot magnet 43 is a pressure ring 91 having an external screwthread fitting into the screwthread 15 formed internally on the housing 1. For the application of a screw-driver, the pressure ring is formed with a number of recesses (not shown).

The pressure ring 91 bears at its pressure face against the free shoulder of the base ring 51 and thereby forces the actual transducer fitted in the housing 1 against the housing base 26 when the pressure ring 91 is tightened in the screwthread 15. The packing rings 37 and 38 disposed within the housing base 26 thus bear against the cover 79 and against the spirit level 34 respectively and thereby form a seal. An example of the polarity of the magnets 2, 3 and 4 is indicated in Figure 1, from which it will be seen that the pole of the pot-magnets 2 which is nearest to the adjacent pole of the movable magnet 4 is of opposite polarity to that pole of the magnet 4, whilst the other pole of the movable magnet 4 and the adjacent pole of the magnet 3 are of like polarity. In this way the magnet 4 is situated in a uniform magnetic field provided by the magnets 2 and 3. When the transducer is vertically mounted, the whole mass of the oscillatory system is drawn downwards by the earth's attraction. The magnet 4, however, is both repelled upwards by the lower magnetic system 3 and attracted upwards by the other magnet 2. In accordance with the invention, the three forces are arranged to be substantially in equilibrium, so that the static mass of the oscillatory system can be regarded as substantially zero. This means that when externally acting forces are applied to the base of the transducer housing 1, only the dynamic action of the oscillatory mass is effective, and the natural frequency of oscillation of the oscillatory system can be brought to as low a frequency as a few cycles per second although using springs 8 and 9 having a spring stiffness which can readily be achieved in practice. It will be appreciated that the compensating action of the magnetic fields is maintained even with substantial movements of the oscillatory system, due to the fact that when the oscillatory system moves upwards the distance between magnets 4 and 3 increases and that between magnets 4 and 2 decreases. Therefore, the repelling force of magnet 3 on magnet 4 is reduced, but the attractive force of magnets 2 on magnet 4 increases to the same extent, so that the total action of the magnetic forces remains the same and the effect of the earth's gravitational field on the oscillatory system is fully compensated in all movements.

Figure 2 shows a force-movement diagram for the oscillatory system. The force or power acting on the oscillatory system in each instance is plotted along the ordinates. The corresponding location of the oscillatory system is designated as a movement in the diagram because the oscillatory system carries out a movement under the influence of ground disturbances. The upward movement is plotted along the abscissae.

The oscillatory system is subjected to the action, on the one hand, of the earth's attraction, which is represented by the broken line 130. In addition, the repelling force of the magnet 3 acts on the oscillatory system. This latter force is represented by the curve 131 and is greatly dependent upon the amount of movement. It is oppositely directed to the earth's attraction. The force of the attracting magnets 2, represented by the curve 132, acts similarly but in laterally inverted fashion.

The forces illustrated by the curves 131 and 132 add together to form the curve 133. This curve is substantially linear within the working region and opposite to the force of gravity. By appropriate design it is arranged that the force represented by the curve 133 over the working range is made equal in magnitude to the force of gravity. Within the working region, therefore, an approximately complete cancellation of the force of gravity is obtained and the weight of the vibratory system is thus eliminated.

When the transducer is exposed to the earth's vibrations, the oscillatory system 5 remains substantially stationary owing to its inertia, and the remaining parts of the transducer then oscillate about the oscillatory system 5 in sympathy with the earth's vibrations. The magnetic field, which extends radially from the pole face 45 to the side wall 49 through the winding 6 disposed in the gap defined by the two, is thereby moved relatively to the said winding 6. The individual turns of the winding 6 thus intersect magnetic field lines, whereby an electromotive force $$e = -w\frac{d\Phi}{dt}$$

is induced in the winding 6, which E.M.F. is applied in the described manner to the measuring leads by which it is conducted to a suitable indicating instrument for giving an indication representative of the earth's vibrations.

For damping the natural frequency and producing a uniform frequency response curve, it is desirable to make the entire coil body and magnet holder 5 of a material of high electrical conductance, for example copper, brass or aluminium. In this way, a uniform response curve from a few cycles per second can be obtained without difficulty.

It is not necessary to provide any device for locking the oscillatory system during transport of the transducer, instead the transducer is inverted so that the resultant magnetic force is additive to the force of gravity instead of being in opposition thereto. As a result, the oscillatory system is brought to rest by engagement of the resilient ring 10 against the surface 11 of the magnet holder 75.

I claim:

1. An electrodynamic transducer comprising a housing, a first magnetic system fixed in said housing, said first magnetic system having an air gap therein, a movable electric coil located in said air gap, resilient suspension means, said resilient suspension means being secured to said housing and to said moving coil for resilient suspension from said housing of said coil in said air gap, a second magnetic system, said second magnetic system having two opposed pole faces one of which faces towards said first magnetic system, said second magnetic system being secured to said moving coil and forming an oscillatory system therewith, a third magnetic system, said third magnetic system being secured to said housing opposite that face of said second magnetic system which is remote from said first magnetic system, the polarity of one of the pole faces of said second magnetic system being the same as that of the magnetic field produced at that face by the magnetic system opposite that pole face, whilst the polarity of the other pole face of the second magnetic system is of opposite polarity to the field produced by the magnetic system opposite that pole face, the resultant magnetic force acting upon said second magnetic system being equal in magnitude to the gravimetric force acting upon said oscillatory system and opposite in direction to said gravimetric force when said transducer is positioned in its operational position.

2. An electrodynamic transducer comprising a housing, a first magnetic system fixed in said housing, said first magnetic system having an air gap therein, an oscillatory system, said oscillatory system consisting of an electric coil, a coil support and a permanent magnet, said electric coil being located in said air gap, resilient means, said resilient means being secured to said housing and to said coil support for resilient suspension of said coil in said air gap, said permanent magnet having two opposed pole faces one of which faces towards said first magnetic system, a further magnetic system, said further magnetic system being secured to said housing opposite that face of said permanent magnet which is remote from said first magnetic system, the polarity of one of the pole faces of said permanent magnet being the same as that of the magnetic field produced at that face by the magnetic system opposite that pole face, whilst the polarity of the other pole face of said permanent magnet is of opposite polarity to the field produced by the magnetic system opposite that pole face, the resultant magnetic force acting upon said permanent magnet being equal in magnitude to the gravimetric force acting upon said oscillatory system and opposite in direction to said gravimetric force when said transducer is positioned in its operational position.

3. A transducer according to claim 2, wherein said coil support is composed of a metal of high electrical conductance.

4. A transducer according to claim 3, wherein said metal is copper.

5. A transducer according to claim 3, wherein said metal is aluminium.

6. An electrodynamic transducer comprising a housing, a first magnetic system fixed in the lower end of said housing, said first magnetic system having an air gap therein, an oscillatory support, an electric coil, said coil being located in said air gap and secured to said oscillatory support, a permanent magnet secured to said oscillatory support, means for supporting said oscillatory support within said housing above said first magnetic system, said permanent magnet having two opposed pole faces the lower one of which faces towards said first magnetic system, a further magnetic system, said further magnetic system being secured within said housing above said oscillatory support, the polarity of the lower one of the pole faces of said permanent magnet being the same as that of the magnetic field produced at that face by the first magnetic system whilst the polarity of the upper pole face of the permanent magnet is of opposite polarity to the magnetic field produced by the further magnetic system, the resultant magnetic force acting upon said permanent magnet being equal in magnitude to the gravimetric force acting upon said oscillatory system.

References Cited in the file of this patent

UNITED STATES PATENTS 2,562,983    Clewell _____ Aug. 7, 1951
2,659,065    Cordell _____ Nov. 10, 1953